US012140942B2

(12) United States Patent
Albrile et al.

(10) Patent No.: US 12,140,942 B2
(45) Date of Patent: Nov. 12, 2024

(54) METHOD OF DIAGNOSIS OF A MACHINE TOOL, CORRESPONDING MACHINE TOOL AND COMPUTER PROGRAM PRODUCT

(71) Applicant: PRIMA INDUSTRIE S.P.A., Collegno (IT)

(72) Inventors: Stefano Albrile, Collegno (IT); Valter Manuello, Collegno (IT)

(73) Assignee: PRIMA INDUSTRIE S.P.A., Collegno (IT)

( * ) Notice: Subject to any disclaimer, the term of this patent is extended or adjusted under 35 U.S.C. 154(b) by 0 days.

(21) Appl. No.: 17/415,480

(22) PCT Filed: Dec. 17, 2019

(86) PCT No.: PCT/IB2019/060894

§ 371 (c)(1),
(2) Date: Jun. 17, 2021

(87) PCT Pub. No.: WO2020/128813

PCT Pub. Date: Jun. 25, 2020

(65) Prior Publication Data

US 2022/0066437 A1 Mar. 3, 2022

(30) Foreign Application Priority Data

Dec. 18, 2018 (IT) ........................ 102018000020143

(51) Int. Cl.
*G05B 23/02* (2006.01)

(52) U.S. Cl.
CPC ..... *G05B 23/0283* (2013.01); *G05B 23/0208* (2013.01); *G05B 23/0254* (2013.01)

(58) Field of Classification Search
CPC ............ G05B 23/0205; G05B 23/0208; G05B 23/0281; G05B 23/0283; G05B 23/0254;
(Continued)

(56) References Cited

U.S. PATENT DOCUMENTS 5,566,092 A 10/1996 Wang et al.
7,301,296 B1 * 11/2007 Discenzo ........... G05B 19/4063 318/434

(Continued)

FOREIGN PATENT DOCUMENTS

EP 1 927 830 6/2008

OTHER PUBLICATIONS

International Search Report and Written Opinion, dated Mar. 24, 2020, from corresponding PCT application No. PCT/IB2019/060894.

*Primary Examiner* — Son T Le
*Assistant Examiner* — Matthew W. Baca
(74) *Attorney, Agent, or Firm* — Nixon & Vanderhye P.C.

(57) ABSTRACT

A method (1000) of diagnosis of operation of a machine tool (10, 100) that includes one or more axes (X, Y, Z) moved by one or more actuators (101, 102, 104) and at least one sensor (30) coupled to the machine tool (10, 100), the method (1000) comprising operations of: generating (1200) a programming sequence of movement of the axes (X, Y, Z) of the machine tool (10, 100); controlling (1210) the movement of the axes (X, Y, Z) of the machine tool (10, 100) according to the programming sequence; receiving (1220) a read-out signal (S) of the at least one sensor (30) coupled to the machine tool (10, 100); and processing (1230) the read-out signal (S) of the at least one sensor (30) coupled to the machine tool (10, 100). The programming sequence comprises instructions that are such as to apply (T) at least one single impulsive variation of a kinematic quantity that regards one or more actuators (101, 102, 104). The operation (1230) of processing the read-out signal (S) comprises processing a response of the machine tool (10, 100) to at least one single impulsive variation. The operation (1230) of processing the read-out signal (S) comprises artificial-neural-network processing (206) via one or more artificial
(Continued)

neural networks (206, 2060) configured for analysing operating profiles in particular, one or more signals indicative of the status of the machine tool (W) in the read-out signal (S).

15 Claims, 6 Drawing Sheets

(58) Field of Classification Search
CPC .............. G05B 23/024; G05B 23/0235; G05B 2219/24053; G05B 2219/24054; G05B 2219/24062; G05B 2219/33285; G05B 2219/33297; G05B 2219/33299; G05B 2219/33303; G05B 19/406; G05B 2219/33027; G05B 2219/33029; G05B 2219/33295; G05B 2219/33296; G01N 29/4481; G01N 29/14; G01N 29/46; G01N 29/4409; G01N 29/4427; G01N 29/4436
See application file for complete search history.

(56) References Cited

U.S. PATENT DOCUMENTS

| | | | | |
|---|---|---|---|---|
| 7,539,549 | B1 | 5/2009 | Discenzo et al. | |
| 2003/0039047 | A1* | 2/2003 | Ottesen .............. | G11B 20/1217 360/48 |
| 2005/0055120 | A1* | 3/2005 | Becker ................. | G05B 19/408 702/187 |
| 2014/0201571 | A1* | 7/2014 | Hosek ................ | G05B 23/0221 714/26 |

* cited by examiner

METHOD OF DIAGNOSIS OF A MACHINE TOOL, CORRESPONDING MACHINE TOOL AND COMPUTER PROGRAM PRODUCT

CROSS-REFERENCE TO RELATED APPLICATIONS

This application is the U.S. national phase of International Application No. PCT/IB2019/060894 filed Dec. 17, 2019 which designated the U.S. and claims priority to IT 102018000020143 filed Dec. 18, 2018, the entire contents of each of which are hereby incorporated by reference.

TECHNICAL FIELD

The present disclosure relates to diagnostic methods of machine tools.

One or more embodiments of the solution disclosed may relate to contexts of pattern recognition and/or predictive maintenance.

TECHNOLOGICAL FIELD

In the framework of diagnostic methods for machine tools, predictive maintenance seeks to predict the time to failure and, consequently, to identify the right moment to carry out the operation required for preventing failure. In this procedure, it is possible to identify one or more parameters of a system—which may, for example, be a machine tool with a plurality of movement axes, in particular a machine tool for laser cutting or laser welding—that are to be measured and processed using appropriate mathematical models in order to predict the time to failure.

In order to measure one or more parameters of a system, various methodologies may be used, such as measurement of vibrations, thermography, absorbed-current analysis, and detection of unusual vibrations. A variation of the quantities measured and monitored with respect to the status of normal operation may hence indicate a degradation of the performance of parts of the system, enabling warning of the usefulness of maintenance in order to prevent an imminent failure.

The quantities monitored may be analysed through a further variety of procedures, amongst which procedures of modal analysis. Modal analysis is the study of the dynamic behaviour of a structure when it is subjected to vibration.

In traditional diagnostic methods comprising modal analysis, the structure of the system that is to be monitored is excited with an external component, for example a calibrated impact hammer or a shaker, which applies dynamic impulse(s) to a part of the machine tool. Via a sensor it is possible to record the reaction of the structure to the above impulse. By analysing the signal acquired by the sensor, it is possible to extrapolate information on the features of the machine tool.

For instance, it is possible to use modal analysis for a method of acquisition of modal parameters of a numerical-control machine tool. Multiple accelerations and decelerations can be applied to the work bench of the numerical-control machine tool in order to generate excitation, so as to facilitate acquisition of the modal parameters of the numerical-control machine tool.

The use of external excitation elements involves the disadvantage of introducing perturbations in repeatability of the excitation: in fact, the impulse applied, for example, via the hammer or shaker, depends upon the generator, the user, and the point of application. The shaker, in fact, exerts a dynamic excitation, for example a driving force, the characteristics of which vary as the resting point of the table varies.

Moreover, machine tools of one and the same type installed in different environmental conditions, for example set on bases made of different materials, present behaviours that are similar but that differ from one machine tool to another as a result of external factors that introduce noise into the response, which is hard to filter out without having information on the external environment.

Modal-analysis methods for acquisition of modal parameters of machine tools can be used during calibration, or dry run, of machine tools: for example, it is possible to acquire modal parameters regarding the velocity of rotation of a main shaft. For instance, it is possible to use methods of this type for calibrating a machine tool with spindle in idle running conditions, via impulsive commands on rotation of the spindle.

A disadvantage of these known techniques is a poor compatibility with normal operation of the machine tool so that calibration has to be performed in a dedicated step (such as dry running) that involves machine-tool down times.

To use modal analysis for purposes of diagnostics and/or predictive maintenance, notwithstanding the vast activity in this area, further improved solutions are desirable.

OBJECT AND SUMMARY

An object of one or more embodiments is to contribute to providing such an improved solution.

According to one or more embodiments, the above object can be achieved by a method having the characteristics set forth in the ensuing claims.

A method for diagnosis of operation of a machine tool comprising one or more axes of movement may provide an example of the aforesaid method.

In one or more embodiments, the above method may acquire, analyse, and process an impulsive response of a structure of machine tool, it being possible to analyse the above impulsive response for providing information on an operating profile, which indicates the possibility of presence of faults in the structure and in the machine tool and/or the type of such faults.

One or more embodiments may regard a corresponding machine tool. A machine tool comprising control modules configured for implementing the diagnostic method and facilitating predictive maintenance may be an example of such a machine tool.

One or more embodiments may include a computer program product that can be loaded into the memory of at least one processing circuit (for example, a computer) and includes portions of software code for executing the steps of the method when the product is run on at least one processing circuit. As used in the present document, reference to such a computer program product is intended as being equivalent to reference to a computer-readable medium containing instructions for controlling the processing system in order to coordinate implementation of the method according to one or more embodiments. Reference to "at least one computer" is intended to point out the possibility of one or more embodiments being implemented in modular and/or distributed form.

One or more embodiments present the advantage of making it easier to achieve improved functions; for example, a mode of stimulation of a CNC chain makes it possible to carry out modal analysis during normal operations carried out by the tool, thus providing a flexibility such as to enable system testing in different positions and with different configurations of the axes.

One or more embodiments moreover present the advantage of making it possible to supply a neural network with homogeneous samples in so far as they derive from a stimulus with characteristics of high repeatability.

One or more embodiments may render the diagnosis advantageously independent of the external conditions in which the machine tool is used.

One or more embodiments may likewise favour remote training of neural networks, for example via data gathered in field.

The claims form an integral part of the technical teaching provided herein with reference to the embodiments.

BRIEF DESCRIPTION OF THE DRAWINGS

One or more embodiments will now be described, purely by way of example, with reference to the annexed drawings, wherein.

DETAILED DESCRIPTION OF EXAMPLES OF EMBODIMENTS

In the ensuing description, one or more specific details are illustrated in order to provide an in-depth understanding of examples of embodiments of the description. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is comprised in at least one embodiment. Consequently, phrases such as "in an embodiment" or "in one embodiment" that may be present in one or more points of the present description do not necessarily refer to one and the same embodiment.

In addition, particular conformations, structures, or characteristics may be combined adequately in one or more embodiments.

The references used herein are provided merely for convenience and hence do not define the sphere of protection or the scope of the embodiments.

Figure 1:
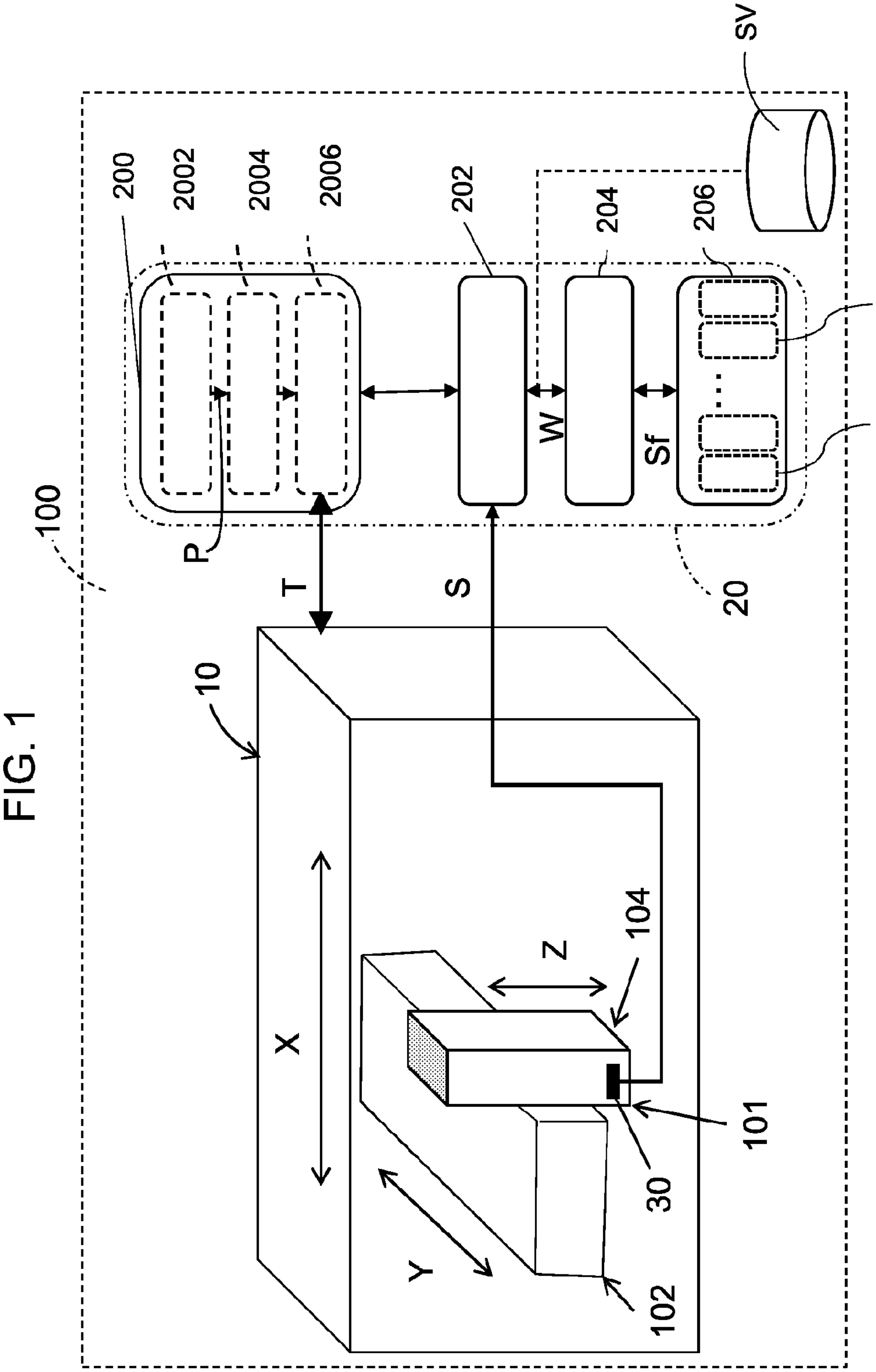
FIG. 1 is a schematic illustration of a machine tool implementing a method according to the solution disclosed herein.

FIG. 1 is a schematic illustration of an example of machine tool 100 that can implement the diagnostic method described herein.

The above machine-tool system 100 may comprise:

- a machine tool 10, for example a machine tool comprising a mobile structure that is able to move, for example according to the cartesian axes X, Y and Z;
- at least one sensor 30 coupled to the machine tool 10; and
- a control module 20, which carries out control of the movement of the machine tool 10.

In what follows, reference will be made, for simplicity, to a system 100 comprising a machine tool 10 with mobile structure of a cantilever type with three axes (designated by the letters X, Y, Z), which is also referred to as "cartesian machine tool". It is to be noted that the type of structure described is not binding; in fact, the solution discussed can be adapted to structures of some other type, e.g., with six degrees of freedom (i.e., with redundant axes).

As has been said, in various embodiments, the aforesaid cartesian machine tool 10 can be used for moving an end effector 101 comprising, for example, a laser-welding or laser-cutting head. In variant embodiments, the machine tool 10 may also use end effectors 101 that perform operations of additive manufacturing, or in general also other machining heads, or end effectors, including machining heads that operate without the aid of laser sources (e.g., arc-welding heads, punches, presses, benders, etc.).

The aforesaid machine tool 10 of the system 100 comprises the axes X, Y, Z, in FIG. 1: a horizontal axis X, a lateral axis Y, and a vertical axis Z. A first actuator of a first arm 102 is mobile along the axis X, for example along a gate structure (not visible in the figure). A second actuator of a second arm 104 is mobile along the axis Y, whereas a further actuator of the end effector 101 is mobile along a vertical axis Z. The ranges of movement along the axes X, Y, Z of the end effector 101 define a working envelope, or working space, associated to the machine tool 10. As exemplified in FIG. 1, the machine tool 10 is represented schematically via the parallelepiped identified by the strokes along the axes X, Y, Z of the end effector 101, namely via its own working envelope, designated by the same reference number 10.

The movement of the first arm 102 and of the second arm 104 of the machine tool 10 in the working envelope 10, as well as of the end effector 101, is determined by a plurality of actuators and/or motors driven by the numerical-control unit 20.

The control module 20, as has been said, is hence configured for being coupled to the machine tool 10, in particular to the motors, for implementing movement of one or more arms 102, 104 and/or of the end effector 101 in the working envelope 10, as described in greater detail in what follows.

It is to be noted that for simplicity in what follows the expression "movement of the axes X, Y, Z" will be used as referring to the operation of driving the motors and/or actuators of one or more arms 102, 104 and/or of the end effector 101 so as to move the one or more arms 102, 104 and/or the end effector 101 according to the aforesaid one or more axes X, Y, Z.

The sensor 30 is coupled to the machine tool 10 and represents a set of sensors 30 for detecting measurements of quantities indicative of operation of one or more parts of the machine tool 10, each sensor of the set of sensors 30 producing corresponding read-out signals or read-out data S. For instance, the set of sensors may comprise at least one of the following:

- a triaxial accelerometric sensor, which produces a read-out signal S of acceleration along one or more axes X, Y, Z, which may comprise a triplet of uniaxial sensors, each set along one of the axes X, Y, Z;
- a virtual sensor, such as an encoder that produces a read-out signal S of position or position error with respect to a programmed position, in a reference system fixed, for example, with respect to the working surface; and
- a capacitive sensor, for example for a laser-cutting machine tool, which supplies a read-out signal S indicating the distance between an output point of the laser and a sheet of metal.

For simplicity, in what follows the term "sensor 30" is used in the singular, it being understood that what has been said for the sensor 30 may be extended, for example to:

- any type of sensor;
- more than one sensor; and
- each sensor of a set of sensors.

The sensor 30 is hence configured for supplying the above read-out data S to the control module 20. The control module 20 can use the read-out data S, for example for:

- carrying out operations of a method 1000 for diagnosis of the status of the machine tool; and/or
- controlling the machine tool 10, for example by implementing a feedback control thereon.

The control module 20, as exemplified in FIG. 1, comprises:

- a CNC (Computer Numerical Control) unit 200, configured for being operatively connected to the motors and/or actuators in order to supply a trajectory of movement T—for example supply positions or a sequence of positions of the arms 102, 104 and/or of the end effector 101 with respect to the axes X, Y, Z—to the motors and/or actuators of the mobile structure of the machine tool 10;
- an interface 202, configured for receiving read-out data S from the sensor 30 and/or instructions (for example, a work program P) from an external operator (not visible in FIG. 1) and for communicating these instructions to the CNC unit 200;
- an intermediate stage 204 configured for supplying or processing the aforesaid read-out signals S, for example for handling passage of the read-out data S of the sensor 30 to processing stages 206, and/or for pre-processing the read-out signals S; and
- an artificial-neural-network (ANN) processing stage 206, comprising a set of artificial neural networks 2060, 2070 (represented as dashed boxes within the stage 206), for example configured for providing indications for diagnosis of any possible malfunctioning of the machine tool.

The CNC unit 200 of the control module 20 comprises, for example (represented as dashed boxes within the stage 200):

- a first processor 2002;
- a second processor 2004; and
- a servo-drive module or board 2006, i.e., one comprising one or more servo drives, servo amplifiers, or servo control modules for the motors/actuators of the machine tool 10.

The first processor 2002 operates as user interface for sending instructions and commands to the second personal computer 2004, which, for example, comprises an operating system of a Linux type associated to extensions of a real-time type for management of the machine tool 10. The second processor 2004 hence supplies trajectories to be executed to the servo-drive board 2006, for example of a PCI DSP type for control of one or more actuators or motors. In the second processor 2004 and in the servo-drive board 2006 a procedure of management of the mobile structure 10 is implemented.

As mentioned, the CNC unit 200 of the control module 20 controls operation of motors and actuators for movement of the axes of the mobile structure 10 according to programs or sequences of programming instructions P predetermined on the basis of the requirements of machining of the workpiece and in a co-ordinated way. The above programs P are prearranged for moving the end effector 101 within the envelope 10 represented in FIG. 1. The CNC unit 200, according to procedures in themselves known in the prior art, generates a sequence of programming instructions P corresponding to a so-called part program for a virtual machine tool with given specifications of acceleration and velocity. The aforesaid sequence of programming instructions P comes from the first processor 2010 and is originated by a purposely designed program for setting the trajectories and movements of the arms 102, 104 and of the end effector 101 of the machine tool 10. Applied thereto is an interpolation function, which, on the basis of the sequence of instructions P, generates the trajectory T of the end effector 101 of the machine tool 10. This interpolation operates in response to preparation codes, or G-Codes, sent within the sequence of programming instructions P. The operation of interpolation is implemented via software within the second processor 2004.

In the CNC unit 200, the first processor 2002, according to one aspect of the solution described herein, can then be configured for generating a programming sequence P of movement of the axes X, Y, Z of the machine tool 10, where the programming sequence P comprises instructions that are such as to apply impulsive variations (for example, variations according to an excitation sequence) of a kinematic quantity (for instance, acceleration, velocity, position) that regards one of the above actuators.

The sequence of programming instructions P, once interpolated in the second processor 2004 of the CNC unit 200, is then supplied to at least one servo drive 2006, configured for controlling a movement, performed via at least one motor or one actuator of the axes X, Y, Z of the machine tool 10 according to the above sequence of programming instructions P.

The interface 202 of the control module 20 may comprise an input/output device, for example a display with touch-screen of a video display terminal for an operator, with which a user can, for example, modify instructions or parameters of instructions of the part program that represents the sequence of programming instructions P.

The intermediate stage 204 of the control module 20 may be configured for operating as manager of the artificial-neural-network processing stage 206, as discussed in what follows. The intermediate stage 204 can pre-process and/or post-process data during an exchange of data, for example read-out data S of the sensor 30 (or other data on the status of the machine tool 10) exchanged between the interface 202 and the artificial-neural-network processing stage 206 to which the intermediate stage applies an operation of transformation into the frequency domain (e.g., a Fourier transform).

The artificial-neural-network processing stage 206 of the control module 20 may comprise a set of artificial neural networks 2060, 2070 configured for being used, for example on the basis of instructions and signals received from the intermediate stage 204, for supplying one or more operating profiles of the machine tool, specifically one or more signals indicative of the status of the machine tool W, associated to which is, for example, information indicating anomalous operation, such as an alarm string warning of the risk of failure of a belt, or else information indicating proper operation.

The operating profile, specifically the aforesaid signal indicative of the status of the machine tool W, can hence be supplied by the artificial-neural-network processing stage 206 to the intermediate stage 204 and/or to other stages, for instance to:

- the interface 202 of the control module 20, which is, for example, configured for communicating the above operating profiles analysed to an operator via output of a text message on the display;
- a server SV, for example an Internet cloud server; and
- an internal network, for example a service LAN.

The server SV can communicate with all the stages of the control module 20 to facilitate downloading of updates of software implementations of operations of the method, such as new versions of the software of the ANN processing stage 206, comprising, for example, the set of re-trained neural networks 2060, 2070. Likewise, the ANN processing stage 206 can send, for example via the intermediate stage 204 or the interface 202 (or else directly), data acquired in field to be added to a remote database on the server SV that contains data to be used for training the networks themselves in order to render subsequent data-processing operations more robust or facilitate analysis of new operating profiles of the machine tool 10, as discussed in what follows.

The control module 20 can hence be configured for exchanging instructions and data P, T, S, W, at input and output, with networks, for example the Internet, with communication modalities in themselves known.

Figure 2:
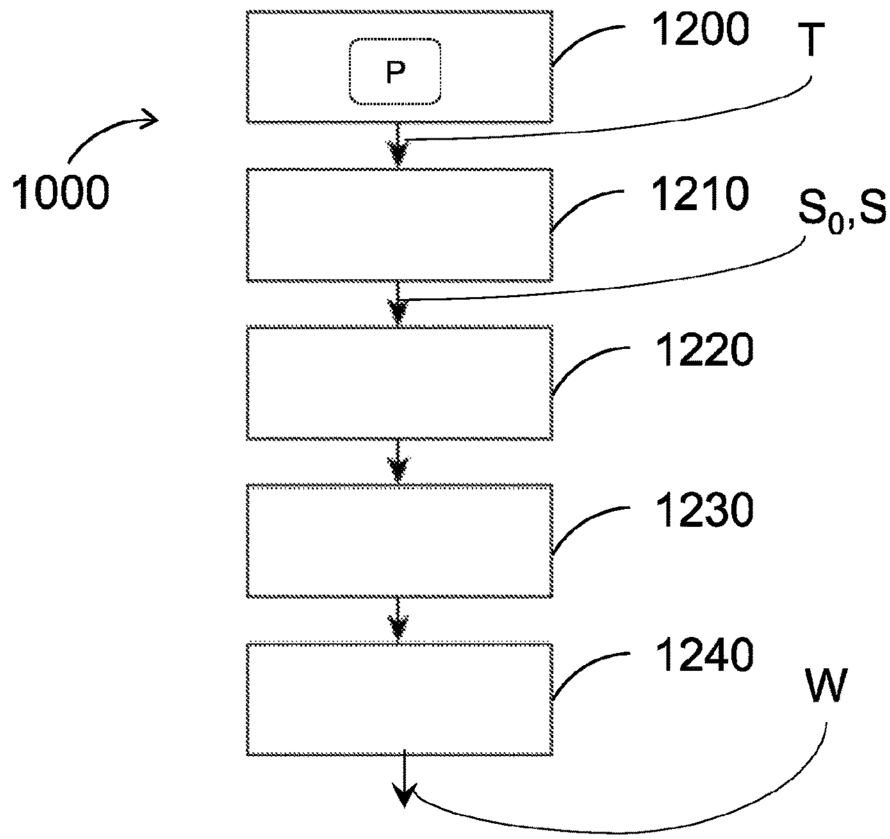
FIG. 2 is a diagram of a method for diagnosis of machine tools as disclosed herein.

The machine tool 100 may be configured, for example according to a control chain of the control module 20, for implementing operations of a method 1000 for diagnosis of a machine tool 10, as discussed in what follows in relation to FIG. 2.

The method 1000 for diagnosis of a machine tool 10 and/or at least one machine tool 10 as described herein may be used in a system for predictive maintenance of a machine tool 10, for example enabling easier automation of provision of maintenance services, automatic planning of such services (type, duration, or date of the intervention), etc. An advantage of carrying out predictive maintenance is to enable reduction of direct maintenance costs, as well as reduction in production loss, which are the natural consequence of non-optimal maintenance interventions like the ones provided, for example, by corrective maintenance.

Figure 8:
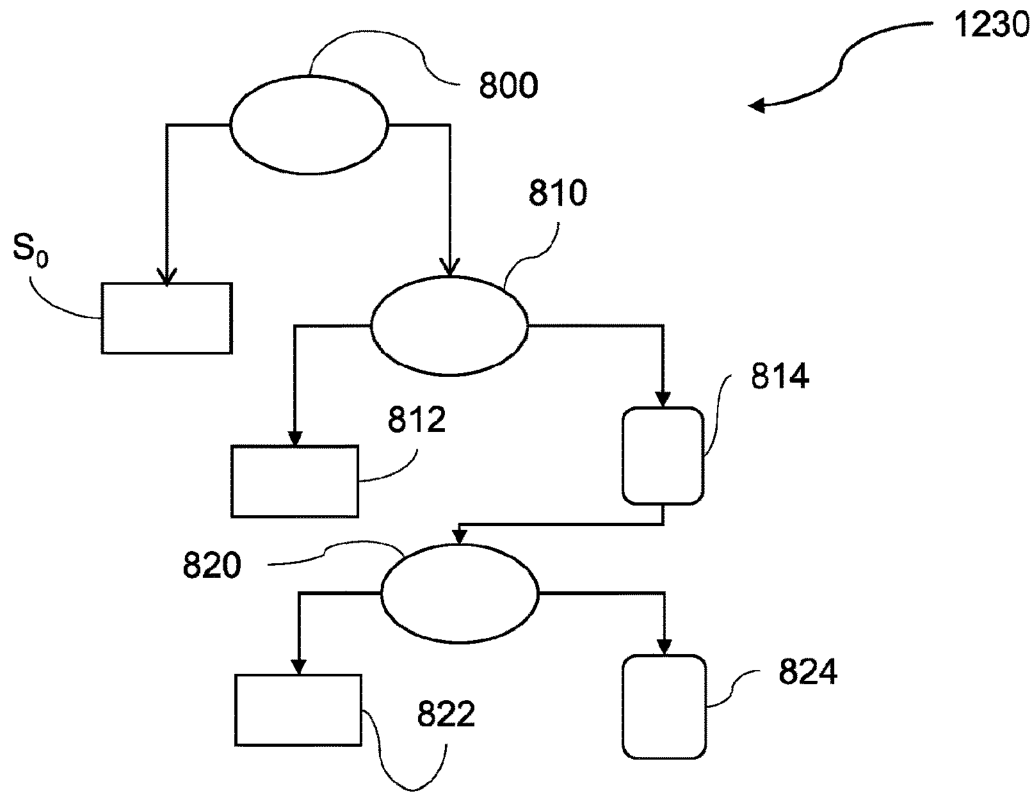
FIG. 8 represents an exemplary diagram of portions regarding the method of FIG. 2.

In one embodiment, the diagnostic method 1000 may, for example:

- in the step designated by 1200, generate in the CNC unit 200 of the control module 20 a sequence of programming instructions P of movement of the axes X, Y, Z of the machine tool 10, the sequence of programming instructions P comprising instructions that are such as to apply a trajectory T comprising impulsive variations of excitation of a kinematic quantity (for example, at least one from among acceleration, velocity, and position) that regards one of the actuators of the axes X, Y, Z;
- in the step designated by 1210, control the movement, along the axes X, Y, Z, of the machine tool 10 according to the above programming sequence P, for example by applying the aforesaid trajectory T comprising impulsive variations of excitation of a kinematic quantity that regards one of the actuators of the axes X, Y, Z;
- in the step designated by 1220, receive a read-out signal S of at least one sensor 30 coupled to the machine tool, this operation including acquiring a response of the machine tool to the trajectory T comprising impulsive variations of excitation of a kinematic quantity that regards one of the actuators of the axes X, Y, Z,
- in the step designated by 1230, process the read-out signal S of the sensor 30, this processing operation 1230 comprising processing the read-out signal S via one or more artificial neural networks 206, in particular in multi-context mode, as discussed in what follows with reference to FIG. 8; and
- in the step designated by 1240, supply user stages with one or more operating profiles of the machine tool 10 on the basis of processing 1230 of the above read-out signal S, for example a signal indicative of the status of the machine tool W supplied via the intermediate stage 204 or else directly by the ANN processing stage 206.

Figure 3:
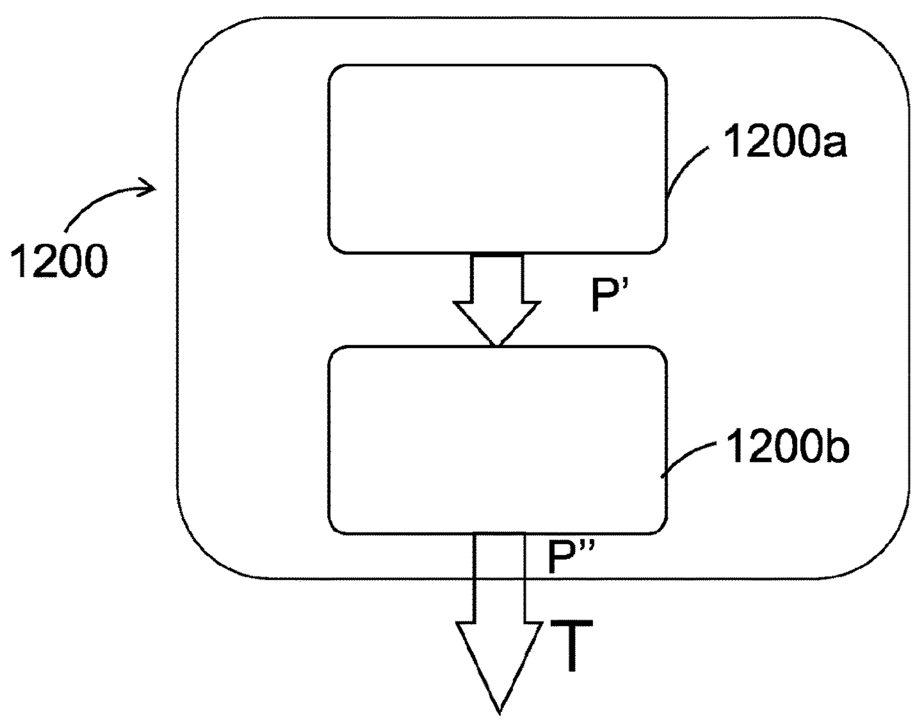
FIGS. 3, 3A, and 3B illustrate by way of example details regarding the diagram of FIG. 2.
Figure 3A:
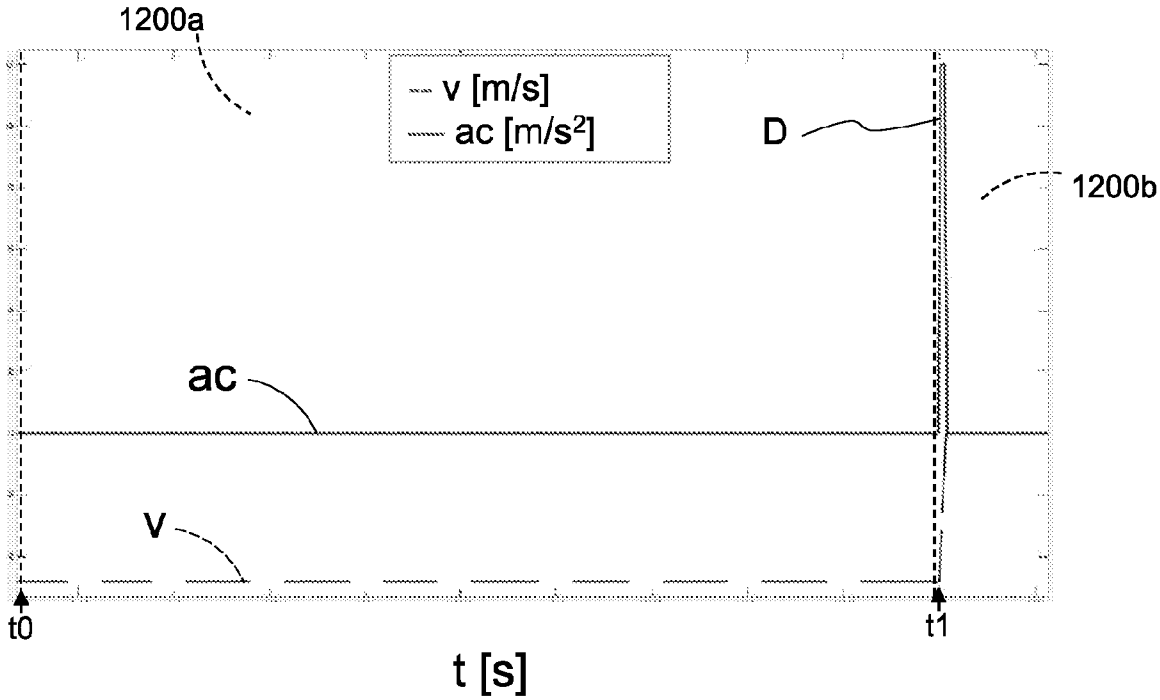
Figure 3B:
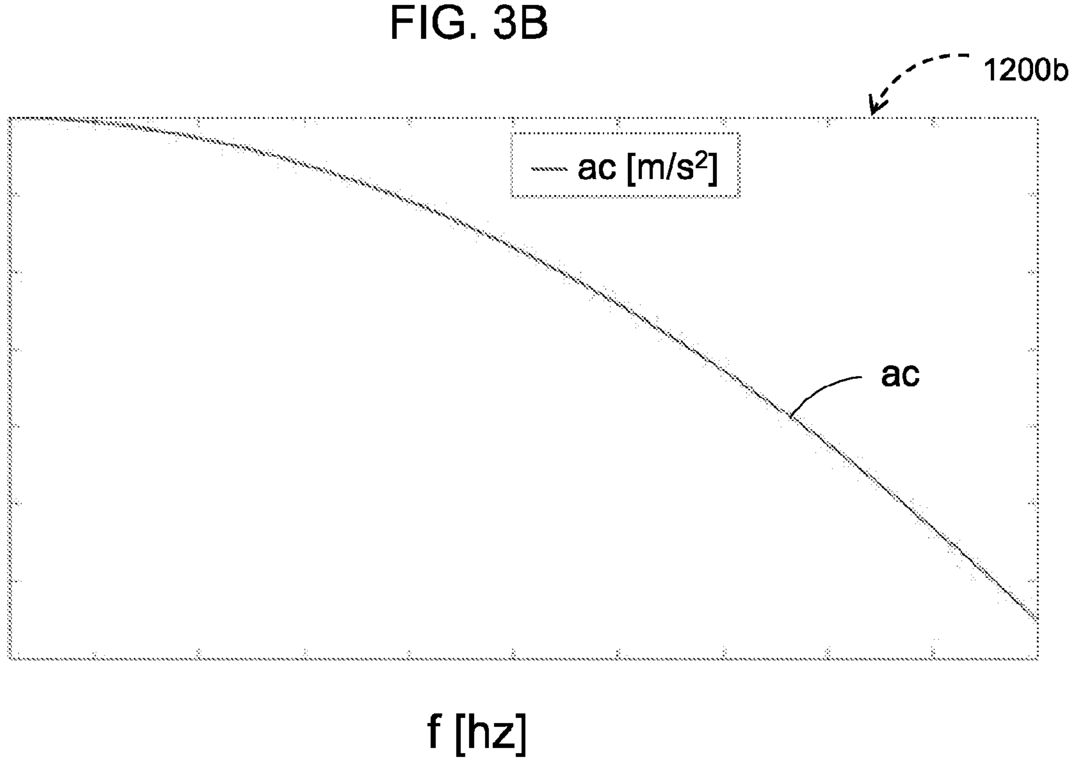

In particular, the operation of controlling 1210 the movement of the axes may comprise applying a trajectory T of the arms 102, 104 and/or of the end effector 101 that comprises a step-like deceleration of the movement along an axis, for example the axis X, of the machine tool 10, for example by "instantaneously" stopping movement of the arms 102, 104 and of the end effector 101 along the aforesaid axis X, as described in detail in what follows with reference to FIGS. 3 to 3B.

The operation of receiving 1220 a read-out signal S of at least one sensor 30 follows, downstream, the operation of controlling 1210 the movement of the axes, thus facilitating acquisition, for example measurement via sensor reading S, of the response of the machine tool 10 to the sequence of instructions of movement regarding one of the actuators of the axes X, Y, Z driven by the CNC unit 200.

It is noted that, unlike traditional methods of modal analysis in which the excitation sequence is generated outside the system 100, for example with a hammer or a shaker as discussed previously, in the present solution the system is "self-exciting", via self-generation of a sequence of programming instructions P, which propagates through the control chain of the diagnostic method 1000.

Yet a further advantage of the above self-generation of the variations of excitation, which may be comprised in a time sequence of excitations, in the CNC unit 200 of the control module 20 of the system 100 is to facilitate production of impulsive variations of excitation in the trajectory T that are extremely similar from one repetition of the method 1000 to another, for example each having one and the same "flat" harmonic content, i.e., a constant harmonic content in the range of frequencies present in the impulsive temporal variation of excitation in the trajectory T.

Consequently, for example with the same operating conditions of the machine tool 10, the sensor 30 records, downstream of application of the impulsive variations of excitation in the trajectory T, a signal S indicating the response of the system to the excitation and generated each time by application of an impulsive temporal variation in the trajectory T that presents characteristics that are substantially constant from one repetition to another. This improved repeatability in the impulsive variation of excitation in the trajectory T facilitates analysis of the read-out signal S acquired by the sensor 30 used for detecting any possible presence of faults, as well as the type of such faults, in operating profiles of the system 100, in particular of each component 10, 20, 30 of the machine-tool system 100 involved in generation, application, and/or reception of the excitation sequence that ultimately results in the trajectory T.

In fact, since instructions or signals corresponding to the impulsive variations of excitation in the trajectory T stimulate the system 100 in a forcing way (in fact, the aforesaid variation of excitation is also referred to as "driving force"), they traverse all the stages of the system 100, propagating through them. Hence, modal analysis of the response S read by the sensor 30 can bring out faults in operating profiles of the machine tool 10 also at levels higher and/or lower than that of the mechanical structure of the machine tool 10 of the system 100, such as malfunctioning of an actuator of one or more axes X, Y, Z, or of the CNC unit 200 itself, for example in a servo drive 2006.

As has been said, with traditional methods the excitation enters the system 100, directly in the mechanical structure of the machine tool 10, hence without the possibility of providing information on the status of the control module 20 or of the sensor 30.

Thanks to the repeatability of the excitation, with the method 1000 it is also advantageously possible to:

- acquire an identifier signal, i.e., a sort of identifier (or ID) code or signature, of the machine tool 10 or of the system 100, which is represented by a reference read-out signal $S_0$ acquired by the sensor 30 in conditions of proper operation, such as at the end of the complete testing stage;
- compare the read-out datum S with the aforesaid reference read-out datum $S_0$, for instance, to filter out from the read-out signal S of the impulsive response the components of noise that is due to the external environment in which the machine tool 10 is operating, for example, by making a comparison; and
- analyse the read-out datum S and/or the reference read-out datum $S_0$ with an artificial neural network, the training phase of which can be executed remotely on a server, in a standard way for a plurality of machine tools.

The above procedure of comparing the read-out datum S with the reference read-out datum $S_0$, for example to filter out the noise due to the external environment, is particularly advantageous because it enables analysis of problems that are hard to detect in so far as in the modal analysis are at frequencies close to the frequencies of "free" vibration (i.e., of proper operation) of the machine tool 10.

The aforesaid reference read-out datum $S_0$ can be stored in a memory accessible by at least one from among the interface 202, the intermediate stage 204, and the ANN processing stage 206 so as to enable its subsequent use to refine neural-network processing 206, as discussed in what follows.

In one embodiment, the operation of generating 1200 a sequence of programming instructions P of movement of the axes X, Y, Z of the machine tool 10, which comprises instructions that are such as to apply a trajectory T comprising temporal variations of impulsive excitation of a kinematic quantity (for example, the velocity v and/or the acceleration ac) that regards one of the actuators of the axes X, Y, Z may comprise a number of steps, one for each set of instructions for one or more of the axes X, Y, Z, as exemplified in FIGS. 3, 3A, and 3B.

Specifically, FIG. 3 represents a diagram of a possible programming sequence P, whereas FIGS. 3A and 3B provide by way of example possible plots of temporal variations of kinematic quantities (FIG. 3A) and the corresponding frequency spectrum (FIG. 3B).

For instance, in FIG. 3:

- a first step, designated by 1200*a*, may comprise execution of a first set of instructions P', which includes implementing a movement along at least one of the axes X, Y, Z at a low velocity v, for example with constant velocity v along the axis X in a time interval ranging, for example, from the instant t0 to the instant t1; and
- a second step, designated by 1200*b*, may comprise execution of a second set of instructions P", which includes a sequence of instructions defining an impulsive variation of excitation, i.e., instructions such as to generate, when implemented by the CNC module, an impulsive variation D of the corresponding kinematic quantity, in this case represented by arrest (v=0), at the instant t1, of the arm along at least one of the axes, for example the axis X, with a high deceleration ac with jerk (i.e., change of acceleration with respect to time) tending to infinity, thus producing a step-like profile of velocity v, as represented by the step in the plot of the velocity v at the instant t1.

In FIG. 3A, possible portions of time plots of variations of kinematic quantities (velocity v and acceleration ac during the steps 1200*a* and 1200*b* are separated by dashed lines and are designated by corresponding references 1200*a* and 1200*b*.

It is noted that, in the example represented in FIG. 3A, the velocity v between the instant t0 and the instant t1 is constant and has a negative value, whereas at the instant t1 its value passes from a constant negative value to zero as a result of machine arrest. The impulsive variation D corresponds to values of positive acceleration, but causes a stop in the movement along the axis X, given the initial negative sign of the velocity v at t0. It is noted that, in what follows, the terms "acceleration" or "deceleration" will be used equivalently in so far as the variation in the kinematic quantity may be either positive or negative according to the method 1000.

The impulsive variation D may hence be an instantaneous stop, i.e., a stop in the shortest time allowed by the movement of the axis X and by the kinematic work point, i.e., an instantaneous acceleration ac from a first velocity (for example, a negative constant velocity v for instants t<t1) to a second velocity (for example, a velocity v equal to zero at the instant t=t1).

Once again illustrated by way of example in FIG. 3B is a possible corresponding frequency spectrum of the impulsive variation D, i.e., of the transform in the frequency domain of the impulsive acceleration ac generated in step 1200*b*, in particular obtained by applying a Fourier transform or Fast Fourier Transform (FFT) to the impulsive variation D. In the example considered in FIG. 3B, the frequency f is comprised in a range of values from 0 to 100 Hz.

It is noted that supplying a sequence of instructions of impulsive excitation in the sequence of programming instructions P comprises, for example, supplying a sequence of excitation instructions such that the corresponding variation of kinematic quantity D has a brief duration, which can be approximated to an instantaneous (impulsive) excitation.

As may be noted from the diagram of FIG. 3, by setting the first set of instructions P', "reduced constant velocity", before the second set of instructions P", "instantaneous deceleration", there is the advantage of facilitating minimisation of the area subtended by the time plot of the deceleration ac. This measure facilitates fine adjustment of the duration by varying the amplitude of deceleration ac and the velocity v, and hence fine adjustment of the harmonic content of the impulsive excitation T.

Hence, the diagnostic method 1000 implemented in the system 100 facilitates propagation of the sequence of excitation instructions P, P', P" that determines the excitation D during the normal operating activities of the machine tool 10, in particular, in masked time, for instance:

- during a step of change of metal sheet during movement of an auxiliary axis, for example corresponding to a turntable;
- during normal daily routine operations, for example at the end of the calibration procedure (axis zeroing);
- while the machine tool is machining another workpiece; and
- in steps during which the machine tool moves at a reduced velocity v.

What has been discussed above involves the advantage that, from the standpoint of the end user of the machine tool 10 and/or of the system, no machine-tool down times are required for applying the diagnostics method 1000, unlike what typically occurs in the case where the impulsive variation of excitation D in the trajectory T is applied by means of a hammer or with a shaker, as discussed previously.

The parameters of the sequence of instructions P for generation of the excitation D (for example, amplitude, frequency, period, number of waveforms in frequency, etc.) can be selected and chosen in a flexible manner, both in a manual mode and in an automatic mode via the part program corresponding to the sequence of programming instructions P and the interface of the first processor 2002 of the CNC unit. This flexibility of selection of the variation D in the trajectory T facilitates execution of the method 1000 on the system 100, for example with one and the same excitation D, applied at moments when the machine tool assumes different positions and with different configurations of the arms 102, 104 and/or of the end effector 101 with respect to the axes X, Y, Z. This leads to the advantage that the method facilitates detection of the type of criticality, for example increasing the precision and accuracy of the diagnostic method 1000.

Finally, the flexibility afforded by the programmability of the part program P in the generation of the excitation D means that the harmonic content of the impulsive variation D is substantially homogeneous over the band of interest, unlike traditional methods, as discussed previously in particular with reference to FIG. 3B.

It is noted that what has been discussed previously as regards the axis X of the example of FIG. 3A may be applied also to each of the axes Y, Z, for example to more than one axis X, Y, Z in sequence or together.

In step 1220, the response, specifically the frequency response, of the system to the excitation is detected by the sensor 30. As has been said, the sensor 30 is representative of a set of one or more sensors 30 for making measurements of quantities indicative of operation of one or more parts of the machine tool 10, to produce corresponding read-out signals S in the sensor 30.

In one or more embodiments, the sensor 30 comprises a type of sensor chosen according to:

- the type of profiles of anomalous operation or faults that are to be analysed; and
- the convenience of use (e.g., on the basis of cost, availability, etc.)

Figure 4:
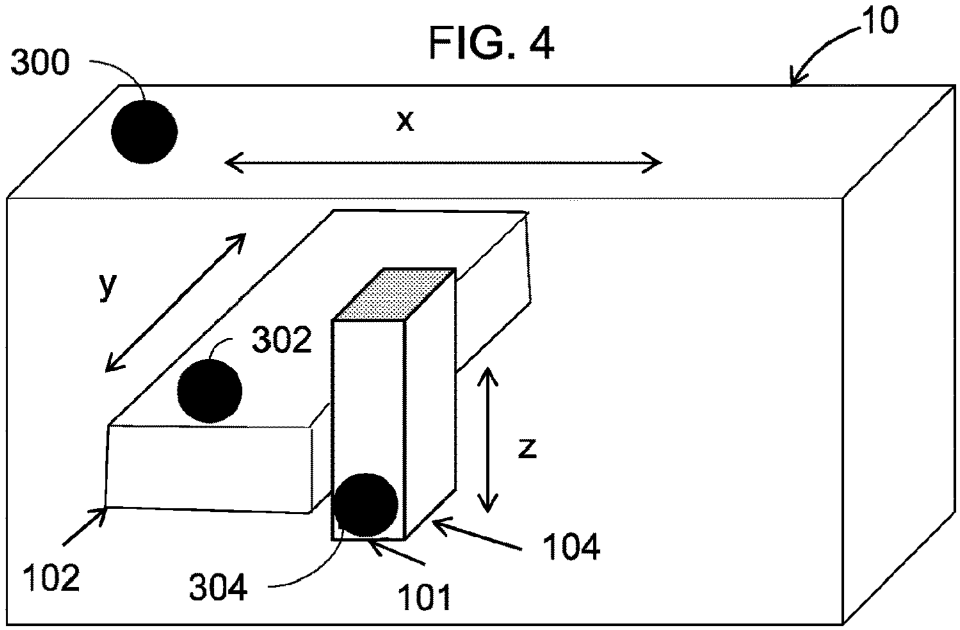
FIG. 4 represents sensor arrangements in a machine tool according to a solution disclosed herein.

Illustrated in this regard in FIG. 4 are a number of positions 302, 304, 306 in which the sensor 30 can be set, which are, for example, associated to the first arm 102, the second arm 104, and the end effector 101, respectively.

As represented, for example, in FIGS. 1 and 4, the sensor 30 is positioned so as to be mechanically coupled to the structure of the machine tool 10, for example in a way fixed with respect thereto. This measure makes it easier to start the diagnostic method 1000 at any moment when the machine tool 10 is operatively available, without it being set offline, with respect to production, for installing the sensor 30 or for setting it in one or more positions 300, 302, 304 in such a way as to record the excitation in the trajectory T.

It is possible to use for this purpose also a sensor element 30 that is already provided for normal operating functions. In particular, it is possible to use as sensor 30 in the diagnostic method 1000 the signal S that is supplied by an encoder, typically installed on the end effector 101, and that, after possible processing thereof, is then used both for correcting the position error of the axes moved X, Y, Z with respect to a programmed position (i.e., for implementing a feedback in control of movement of the axes X, Y, Z) and for recording the read-out signal S that indicates the impulsive response of the machine tool 10, specifically the frequency response. In fact, during propagation of the impulsive sequence of excitation T, the control axes X, Y, Z themselves are excited, for example vibrating as a function of the excitation T. Consequently, if the position of the axes X, Y, Z is recorded, for example by the CNC unit 20, during this vibration of reaction to the excitation T, a position error is caused in so far as the position of the axes X, Y, Z is not the same as the one set as target in the control 200.

The signal of the position error of the axes X, Y, Z with respect to a programmed position of the encoder on the end effector 101, which operates as virtual position sensor, can thus be used as read-out signal S of the sensor 30. The method 1000 hence presents an advantage in not requiring installation of further sensors in the machine tool 10 beyond the virtual sensor 30 already present.

In a further example of embodiment, the sensor 30 comprises a sensor of a capacitive type, for example a capacitive sensor, provided in a way in itself known, set in the proximity of an output point of a laser beam in a laser machine tool 10. Such a capacitive sensor 30, for example, supplies the measurement of the distance between the aforesaid output point of the laser and a sheet of metal being machined in so far as, to carry out proper cutting and prevent collision of parts of the machine tool 10, in particular of the end effector 101, with the aforementioned workpiece, it is useful to maintain a constant gap between the latter and the end effector. The read-out signal S supplied by the capacitive sensor 30 is useful for feedback control, for example via the control module 200, of an axis that manages this gap.

In a variant embodiment, it is possible to get the final portion of the impulse D to correspond to a positioning of the end effector 101 such that the sensor 30 is at a very short distance from the metal sheet. In this way, the read-out signal S coming from the sensor 30, which corresponds to the distance between the metal sheet and the end effector 101, assumes an oscillating pattern, the oscillations of which can be analysed in a way similar to those of the read-out signals of the triaxial accelerometer.

Also in this case, the advantage consists in not having to add further external devices for measuring the impulse response in the diagnostic method 1000, specifically the frequency response. In addition, the use of this capacitive sensor may be particularly indicated for analysing the set of faults linked to operation of the sensor 30 itself integrated in the machine tool 10.

It is noted that the sensor 30 is preferably set as downstream as possible in a mechanical transmission chain of the machine tool 10. With reference to a structure 10, as exemplified in FIG. 4, the preferable position for the sensor 30 would be that of the sensor designated by the reference 304, set in the proximity of the end effector 101 since it is able to detect in the best possible way the mechanical transmission of the impulse in the arms 102, 104 of the machine tool 10, for example along the axes Y, Z, it being possible to analyse the impulse to detect operating profiles of the machine tool 10.

In a similar way, the sensor 30 located in a second position 302, fixed with respect to the first arm 102, can, for example, detect with higher sensitivity operating profiles that comprise faults linked to the mechanical transmission along the axis X.

Likewise, the sensor 30, located in a first position 300 fixed with respect to the reference system in which the machine tool 10 is installed, can, for example, detect with higher sensitivity operating profiles that comprise faults in relation to fixing of the machine tool to the ground.

The above sensor 30 may further comprise, for example, one or more of the following functions:

- processing the analog signals and transmitting them in digital format to render them more immune to disturbance of an electrical nature; and
- transmitting the signals to the interface 202 via wireless or wired transmission.

Figure 5:
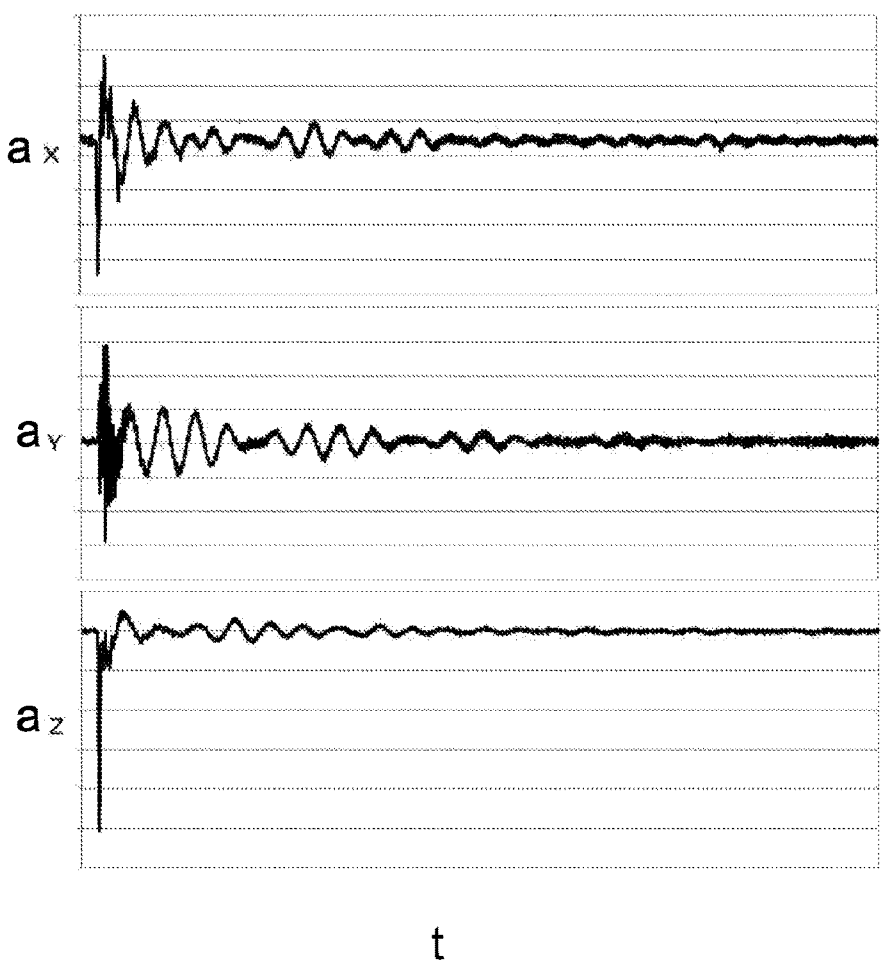
FIG. 5 represents an exemplary diagram of portions regarding the method of FIG. 2.

In one embodiment, the sensor 30 comprises the triaxial accelerometer, which acquires, following upon application of the impulsive variation D in the trajectory T, a read-out signal S having components $a_x$, $a_y$, $a_z$ that represent the measurements of the acceleration time plots along each of the axes, as illustrated in FIG. 5.

It is noted that processing of the sensor read-out signal S in the stages 204, 206 is described in what follows, for simplicity, in relation to the acceleration signals $a_x$, $a_y$, $a_z$, it being moreover understood that the present discussion is provided purely by way of non-limiting example in so far as such processing can extend to other types of signal coming from other types of sensor (position error, distance from metal sheet, etc.).

In the particular example of FIG. 5, represented therein is a sampling window in which the signals are sampled by the sensor 30, for example, a window having a time width of 1 s, which starts a few milliseconds, for example 20 ms (1 ms=1 millisecond=$10^{-3}$ s), before application of the impulse D, and terminates a certain time after, for example 980 ms after.

Each curve in the graph of FIG. 5 represents the plot of the acceleration, for example, obtained by interpolating the sampled data, along each of the three axes X, Y, Z, where:

- $a_x$ is the component of the acceleration along the axis X;
- $a_y$ is the component of the acceleration along the axis Y; and
- $a_z$ is the component of the acceleration along the axis Z.

It is noted that it is possible to choose to analyse even just one of the components of the acceleration $a_x$, $a_y$, $a_z$. For instance, if the excitation impulse T excites movement of the axis X it is possible to choose to analyse just the component $a_z$ along the axis Z of the read-out signal S. This choice may be motivated by considerations of orientation between a position 300, 302, 304 of the sensor 30 and the axes X, Y, Z of the machine tool 10. This choice may be set, for example, as automatic selection or else may be made by a user.

Figure 6:
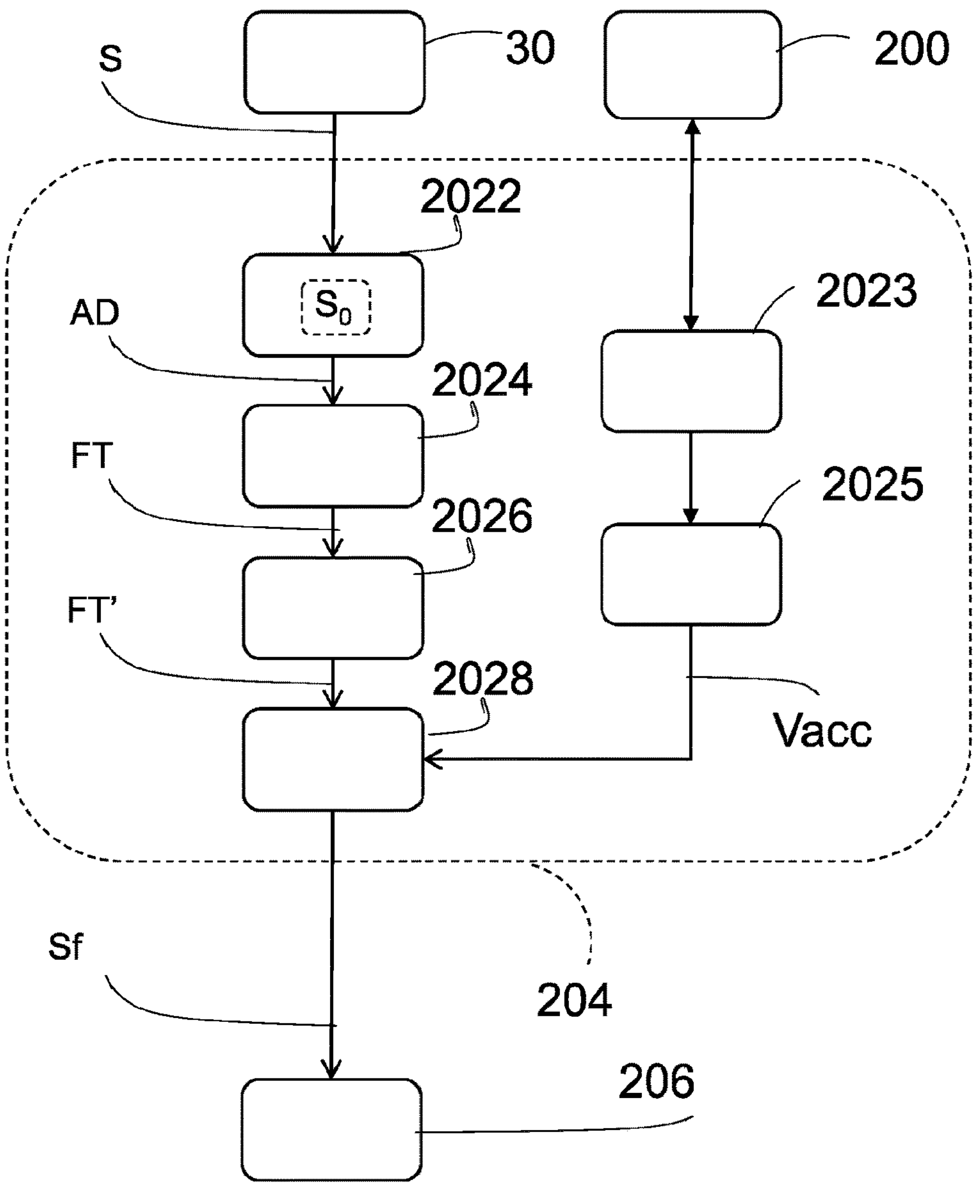
FIG. 6 is an exemplary diagram of data processing according to one or more embodiments of the method disclosed herein.

As anticipated in relation to FIG. 1, the sensor 30 supplies the read-out signal S to the interface 202 of the control module 20, which in turn supplies it to the intermediate stage 204, which processes it, for example as exemplified in the diagram of FIG. 6.

Once acquisition of the read-out signal S of the sensor 30 that represents the response of the machine tool 10 to the variation D has been completed (e.g., with a total duration of the operation of 1 s), for example in step 1210 of the method 1000, the intermediate stage 204 of the control module 20 is configured for carrying out steps of data pre-processing, in order to supply the ANN processing stage 206 with the data to be analysed, as represented by way of example in FIG. 6, where:

- in the step designated by 2022, the stage 204 receives the read-out signal S from the interface 202 or from the sensor 30 and associates thereto a respective array AD, for instance having one component Ax, Ay, Az for each axis in which it stores the respective arrays of data samples S acquired by the sensor 30 for one or more of the axes X, Y, Z, for example saving it/them to a memory; the read-out data S, and hence the respective arrays Ax, Ay, Az, may be interpolated in order to reduce the computational cost; the aforesaid memory may moreover contain, stored therein, the reference read-out signal $S_0$, which also may be, for example, in the form of an array having one component for each axis; in step 2022, it is possible to carry out an operation of comparison between the read-out signal S of the sensor 30 and the reference read-out signal $S_0$—in particular, an array can be generated indicating a difference between the read-out signal S and the reference read-out signal $S_0$—if so required by the analysis, as discussed in what follows; for simplicity, in what follows, reference will be made to a generic array AD in which the measurement data are stored, which may be an array of arrays of data; i.e., it may comprise, within it, one or more component arrays Ax, Ay, Az for each of the axes X, Y, Z and can indicate either the read-out signal S or the data obtained by computing the difference in absolute value between the read-out signal S and the reference read-out signal $S_0$;
- in the step designated by 2024, the FFT (Fast Fourier Transform) is applied to the array AD to supply at output an array FT of transformed data that comprise the transformed arrays FTx, FTy, FTz, which are obtained by applying the FTT to the components Ax, Ay, Az of the array AD and represent a spectrum FT of response of the machine tool to the impulsive variation; and
- in the step designated by 2026, sub-arrays FT' are extracted starting from the transformed arrays FTx, FTy, FTz so as to select one or more frequency ranges, in particular closed frequency ranges, ranging between given frequencies $f_{min}$, $f_{max}$, which are determined according to the type of analysis that is to be performed, and representing one or more portions of the spectrum FT of the response of the machine tool to the impulsive variation; this operation may comprise creating further arrays having components FTx_min_max, FTy_min_max, FTz_min_max corresponding to the aforesaid ranges $f_{min}$, $f_{max}$ selected in the sub-arrays FT', which, in particular, contain information in frequency ranges that fall between a minimum value $f_{min}$ and a maximum value $f_{max}$; for instance, these extremes $f_{min}$, $f_{max}$ of the ranges may be determined in such a way that:

$f_{min}$=1 Hz, $f_{max}$=60 Hz, for example, if it is desired to analyse the presence of structural faults; and $f_{min}$=170 Hz, $f_{max}$=230 Hz, for example, if it is desired to analyse the presence of faults on encoders.

Figure 7:
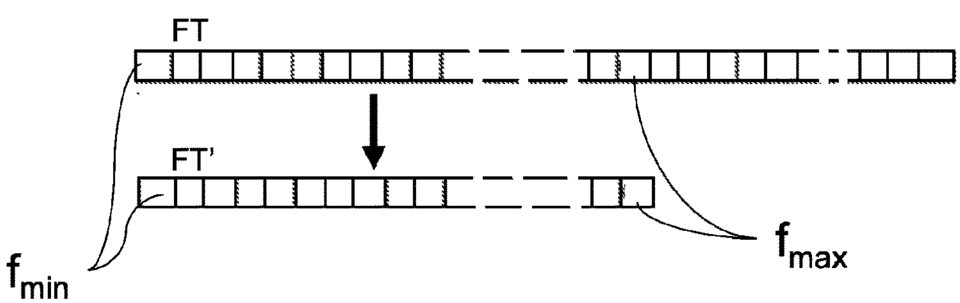
FIG. 7 represents by way of example details regarding operations of the diagram of FIG. 6.

FIG. 7 represents an example of how it is possible to carry out the above operation of decomposition and separation of the data, as exemplified in FIG. 6 by step 2026.

As exemplified in FIG. 7, a first array FT (for example, supplied in step 2024) of transformed arrays FTx, FTy, FTz is represented as a set of indexed cells, each cell comprising data corresponding to a certain frequency. In the example considered, the cells indexed from $f_{min}$ to $f_{max}$ comprise data corresponding to the frequency range from 1 Hz to 60 Hz: as anticipated, this frequency range from 1 Hz to 60 Hz is of interest for analysing operating profiles of the machine tool 10 in the presence of structural faults. In step 2026, the cells of the closed frequency range of interest between $f_{min}$ and $f_{max}$ are hence selected, and these data are supplied as array FT' by the stage 2026.

An operation designated by 2023, which can be executed in parallel or in series with the operations already illustrated, is the operation of acquiring from the CNC unit 200, for example via the interface 202, data regarding:

- thermal load of the motor on one or more axes at the moment of the impulse;
- position of one or more axes at the moment of the impulse;
- number of working hours of the system; and
- code identifying the impulse program executed by the CNC.

In a further step (designated by 2025), which again can be executed in series or in parallel with the steps illustrated so far, the list of data acquired in step 2023, for one or more axes X, Y, Z, is sent to/stored in an array Vacc.

Finally the method may comprise the operation, designated by 2028, of converting the arrays of data acquired or processed, such as the set of arrays AD, FT, FT', Vacc, into a data format compatible with a data format of the artificial-neural-network stage 206, to obtain a set of data Sf that comprise the frequency spectrum FT, FT' of the read-out signals S. This data set Sf, which comprises data indicating the response of the machine tool to the impulsive variation, is hence supplied to the ANN processing stage 206.

It is noted that the operations 2022 to 2028 can also be executed in a different order and/or iteratively during operations performed in the course of ANN processing 206, or as discussed in what follows.

The ANN processing stage 206 may comprise a set of ANNs, which include, for example:

- ANNs trained with different sets of training data;
- ANNs trained with different training functions; and
- ANNs with different structures, for example different numbers of hidden layers or neurons.

The aforesaid ANNs can operate in parallel on one and the same set of data Sf or on copies of one and the same set of data Sf received.

The different neural networks in the ANN processing stage 206 are arranged so as to present a number of layers and a number of neurons, and so as to be trained according to the types of anomalous operation or faults that are to be identified.

Some subsets of anomalous operations/faults sought in the analysis of the read-out signals S of the sensor 30, which are referred to as “contexts of analysis”, may be grouped into sets of faults/anomalies, for example, of the following kinds:

- physical kind: for example, anomalies/faults in the mechanics of the transmission belt, damage to the roller bearing of one or more axes, installation base of the machine tool faulty, bearing of the ballscrew damaged, belt slackened or fixing of the linear motors loosened;
- electrical or electronic kind: for example, anomalous/incorrect setting of the servo drive, (linear or rotary) brushless motor faulty, misalignment of the optical straight edge, faulty mechanical position transducer for measurement of the backlash; and
- (computer) software kind: for example, anomalies/errors in the settings of the CNC module.

In embodiments of the solution discussed herein, the contexts/subsets of analysis can be selected as a function of the instructions contained in the part program P.

As has been said, processing, for example in step 1230 of the method 1000, of the set of data Sf that comprise the spectrum FT, FT' of the read-out signal S in the ANN processing stage 206 is managed in multi-diagnostic or multi-context mode, as represented, for example, in FIG. 8.

By “multi-context mode” is meant a mode of operation of the neural network that is defined in a flexible manner according to the requests. For instance, it may change according to the sub-set of events (in terms of faults) that are to be analysed, the type of data, in particular the frequency range $f_{min}$, $f_{max}$ considered in the set of data Sf that is sent to the set of networks 2060, 2070 of the stage 206.

FIG. 1 is a diagram provided by way of example of a case where the ANN processing stage 206 comprises:

- a first neural network ANN 2060; and
- a second neural network ANN 2070.

It is noted that the two neural networks 2060, 2070 may have one and the same architecture and differ as regards training, for example as regards the frequency range $f_{min}$, $f_{max}$ in which they are trained to analyse anomalous operating profiles of the machine tool 10.

For instance, the first neural network 2060 can be supplied already trained to analyse operating profiles in a first, relatively wide, frequency range (for example, from 0 Hz to 100 Hz), whereas the second neural network 2062 may be supplied already trained to analyse operating profiles in a second, relatively limited, frequency range (for example, with frequencies f comprised between 5 Hz and 50 Hz). In one embodiment, the first neural network 2060 may comprise a network supplied already trained, for example, with training function according to the conjugate-gradient method and with data falling within a frequency range from 5 Hz to 50 Hz.

In other cases, the neural networks may be completely different in every parameter or have some parameters in common and others different.

Figure 9:
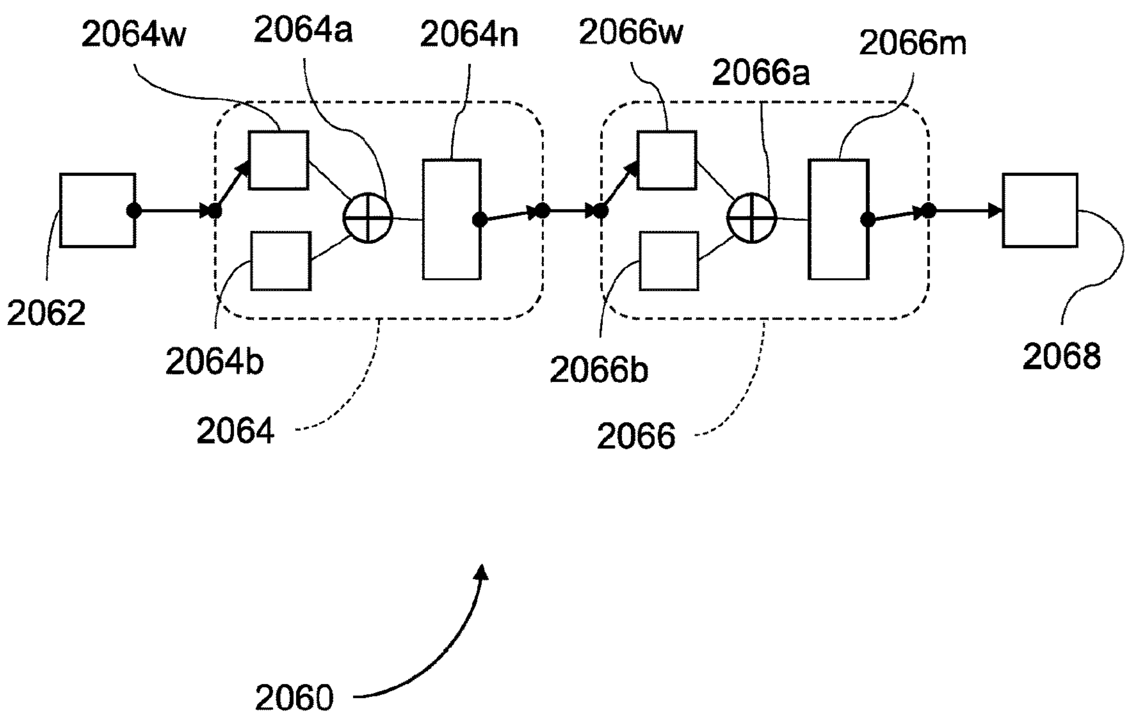
FIG. 9 represents a diagram provided by way of example of a portion regarding the diagram of FIG. 1.

FIG. 9 represents an architecture provided by way of example of the ANN 2060.

As illustrated in the example of FIG. 9, the first network 2060 may present a feed-forward topology and comprise:

- an input layer 2062, which conveys input data;
- an output layer 2068, which collects output data;
- a first neural-network processing layer 2064, coupled to the input stage; and
- a second neural-network processing layer, coupled to the first processing layer and to the output layer 2068.

The first processing layer 2064 may comprise a set of n neurons 2064_n_, where, for example, n=20, which receive at input the set of data Sf that comprise, for example, the frequency spectra FT' of read-out signals S in closed frequency ranges $f_{min}$, $f_{max}$ which are weighted by weights

2064$w$ and added to bias data 2064$b$. The neurons 2064$n$ can have one and the same transfer function, for example of a sigmoid type.

The second processing layer 2066 may comprise a second set of m neurons 2066$m$, where, for example, m=2, which receive at input data that are weighted by weights 2066$w$ and added to bias data 2066$b$. The neurons 2066$m$ may have one and the same transfer function, for example an activation function of a softmax type. The respective weights 2064$w$, 2066$w$ of the first processing stage 2064 and of the second processing stage 2066 may be initialised at random values according, for example, to a Gaussian distribution.

To return to the discussion of FIG. 8, the operation, designated by 1230 in the diagram of FIG. 2, of processing the set of data Sf that comprise frequency-spectrum data FT, FT' of the signal S may be performed via one or more artificial neural networks 206 in multi-context mode, and may include the operations of:

verifying, in the step designated by 800, whether an ID code or reference read-out signal $S_0$ of the machine tool has been acquired, and a) acquiring the reference read-out signal $S_0$ in the case, for example, of first turning-on of the machine tool 10 after a test has been successfully concluded;

b) otherwise, in the case of normal operations (e.g., test already carried out), analysing operating profiles and searching faults in general in the set of data Sf that regard, for example, the entire spectrum FT of the read-out signal S as compared to the reference read-out signal $S_0$; if, in step 800, also in the case of normal operations, no faults are found, but the reference read-out signal $S_0$ is not yet present in the memory, it is possible to carry out acquisition of the reference read-out signal $S_0$.

In the case where, in step 800, generic faults are found in the set of data Sf, it is possible to proceed to the step designated by 810, which comprises selecting one or more of the following operations:

sending, in the step designated by 812, a first indication of presence of a profile of anomalous operation or of a problem to user stages, for example a generic error alert without specifying the type of error, providing the signal indicative of the status of the machine tool W to the interface 202, which can thus display a message on the video display terminal for the operator; and analysing, in the step designated by 814, for example via the first artificial neural network 2060, a first type of profile of anomalous operation or fault, for example to verify whether there is wrong tensioning of a transmission belt, once again supplying the first neural network 206 with the set of data Sf; to carry out analysis of this first kind of fault in step 814, the intermediate stage 204 will hence supply the neural network with the set of data Sf that comprise specifically a portion of frequency spectrum of the signal FT' included in the frequency range of interest for the particular fault, for example between 5 Hz and 50 Hz, in an iterative way.

As has been said, the spectrum FT (and/or the portion of spectrum FT') may correspond either to the spectrum (and/or portion of spectrum) of the read-out signal S or to the spectrum (and/or portion of spectrum) of a signal obtained from comparison of the read-out signal S with the reference read-out signal, for example the signal indicating the absolute value of the differences between the spectrum of the read-out signal S and the spectrum of the reference read-out signal $S_0$, in particular if the latter is already stored and/or when the intermediate stage 204 is configured for supplying this signal for the type of analysis to be carried out (and in the corresponding frequency range $f_{min}$, $f_{max}$).

Following upon processing via the aforesaid first ANN 2060 in step 814, the neural-network stage 206 may supply an indication, for example collected in the output stage 2068, of the presence or otherwise of the above fault or anomalous operation. In a step 820, it is possible to select, on the basis of the aforesaid indication provided by the first neural network 2060 one or more of the following operations:

sending, in the step designated by 822, a second indication of presence of a specific profile of anomalous operation to user stages, for example to the interface 202, which can receive the signal indicative of the status of the machine tool W updated on the basis of the processing 2060 and can display a message regarding the operating profile or the type of operation, for example a descriptive message of the fault detected in the case where the indication provided by the first network 2060 is “fault detected”; and analysing, in the step designated by 824, for example via the second artificial neural network 2070, a second type of profile of anomalous operation or fault, hence supplying the second neural network 2070, for example via the intermediate stage 204, with the data set Sf comprising data regarding a second portion FT' of the spectrum FT of the read-out signal S, for example for frequencies $f_{min}$=50 Hz and $f_{max}$>50 Hz.

As has been said, if for example in step 820 the first neural network identifies, on the basis of the analysis carried out in step 814, a fault on the mechanical transmission of the horizontal axis X, in step 822 the interface 200 receives the signal W indicative of the status of the machine tool. The interface 200 may be configured so as to issue a video message, displaying, for example, a message containing information processed on the basis of the operating profile analysed, for instance a string associated to the signal W indicative of the status of the machine tool such as:

“X-Transmission needs maintenance, please contact customer service . . . ”

In an embodiment, the above message may be personalised and vary according to the type of analysis made, the type of machine tool, the type of human-machine interface, etc.

It is noted that what has been discussed previously regarding a set of neural networks 206 that comprises two neural networks 2060, 2070 may be applied to any number of neural networks in the set of neural networks 206, hence supplying in series the set of data Sf each time to one neural network in the set of neural networks 206, for example to the neural network trained to recognize a specific fault or a specific type of anomalous operation in order to analyse operating profiles in the set of data Sf processed as a function of the sensor read-out signal S.

In an embodiment, the method 1000 may comprise a number of iterations of the sequence of operations detailed in step 1230, it being possible for these operations to be carried out also in a sequential order different from the one presented in the previous paragraph. In particular, as mentioned, successive iterations may comprise execution of one and the same sequence of operations but on subsets of portions of spectrum FT, FT' in the set of data Sf indexed via different identifier codes, for example labelled with identifier numbers.

Specifically, the operations of the method for management of the neural network 206 may be applied in sequence to different data subsets FT, FT', for example, in increasing or decreasing order of identifier number or in some other order, until a set or sub-set of types of anomalous operation and/or faults that are to be analysed (mechanical, electrical, software, etc.) has been covered.

Downstream of the sequence of processing operations 1230 and of the possible iterations of the method 1000, the various operating profiles analysed and results of the analyses of the individual neural networks 2060, 2070, may be merged in a merged operating profile, which comprises, for example, a global signal indicative of the overall status of the machine tool W'.

In an embodiment, the neural networks of the ANN processing stage 206 can be trained on data S acquired by the sensor during movement of the axes X, Y, Z.

The step of training of the neural networks may be carried out, for example:

in local mode, for instance using data present in a database (which may be created on the spot and filled with the data S, Sf that are collected during implementation of the diagnostic method 1000); or else in remote mode, i.e., for example, by downloading, from a remote server SV, an updated version of the software corresponding to the aforesaid trained or re-trained neural networks 2060, 2070, i.e., portions of software code that implement one or more of the trained or re-trained neural networks 2060, 2062.

As an alternative or in addition to this, training input data can be supplied to the ANN processing stage 206 either in real time, during operation of the machine tool itself, or off-line, for example following upon downloading from a virtual repository accessible via Internet connection.

Training of the neural networks can be carried out more than once on one and the same network or on different networks with the same data or with different data so as to guarantee maximum flexibility of the system in order to be able to identify the largest number of possible types of faults and/or anomalous operation and supply the user stages with detailed information on the operating profile of the machine tool, as a signal indicative of the status of the machine tool W.

It is noted that in general the control module 20 may comprise one or more memory areas or memory devices (for example, databases) in which to store one or more sets of data, which comprise, for example, the read-out data S of the sensor, the set of data Sf, the reference read-out signal $S_0$, and other data (for example, the weights 2064*w*, 2066*w*) processed during application of the method 1000.

As has been said, the neural networks of the set of neural networks 206 can be supplied already trained and can be updated so as to include new neural networks trained with new data, in the case where new types of faults or anomalous operation are found and new training or insertion of new trained neural networks is hence required: events previously not recognised by the system (for example, following upon recognition of new types of faults or anomalous operation) may be used for updating the remote training database. It is hence possible to download a new updated version, understood as implementing version, of the method 1000 that includes the re-trained neural networks (for example re-trained in off-line mode on data present on a remote server).

In general, the neural networks are configured for carrying out analysis of operating profiles in the response of the machine tool, measured by the sensor, to the impulsive variation, such as recognition of a correct operating profile (for example, by comparing the spectrum of the measured signal FT with that of the reference signal $S_0$) or of a faulty operating profile (for example, by detecting the presence of peaks in the response of the machine tool, in particular in the frequency response).

Without prejudice to the underlying principles, the details and embodiments may vary, even appreciably, with respect to what has been described herein purely by way of example, without thereby departing from the sphere of protection, as defined in the annexed claims.

The invention claimed is:

1. A method, comprising:

performing diagnosis of operation of a machine tool comprising at least one sensor coupled to said machine tool, wherein the machine tool comprises an end-effector configured to be moved along one or more axes of a working envelope by one or more actuators, said method comprising operations of:

generating a programming sequence of movement of the end-effector along one or more axes of said machine tool, wherein the programming sequence comprises machining-programming sequence instructions to apply at least one single impulsive variation of a kinematic quantity of movement of the end effector along one or more axes;

controlling the movement of the end-effector along one or more axes of said machine tool by means of a control chain comprising:

performing said operation of generating said programming sequence, obtaining as a result a trajectory of movement for actuation of one or more axes of said machine tool from said programming sequence, and supplying said trajectory of movement for actuation of one or more axes of said machine tool to actuators of said one or more axes;

receiving a read-out signal of said at least one sensor coupled to said machine tool; and processing said read-out signal of said at least one sensor coupled to said machine tool, generating a reference read-out signal corresponding to the machining-programming sequence without the at least one single impulsive variation;

comparing said read-out signal with the reference read-out signal; and modifying the read-out signal based on the comparison;

wherein said impulsive variation is included in a machining-programming sequence predetermined on the basis of a workpiece to be machined within the working envelope of the machine tool, said machining-programming sequence comprising instructions that apply at least one single impulsive variation of a kinematic quantity of movement of the end-effector with respect to one or more actuators in said trajectory of movement, so that the at least one single impulsive variation-propagates through said control chain, wherein said operation of processing said read-out signal comprises processing a response of said machine tool to said at least one single impulsive variation included in the machining-programming sequence, and wherein said operation of processing said read-out signal comprises an artificial-neural-network processing via one or more artificial neural networks configured for analysing one or more signals indicative of the status of the machine tool in said read-out signal.

2. The method according to claim 1, wherein comparing said read-out signal with said reference read-out signal comprises providing a signal indicating the absolute value of the differences between said read-out signal and said reference read-out signal.

3. The method according to claim 1, wherein said operation of processing a response of said machine tool to said at least one single impulsive variation comprises generating a read-out signal in the frequency domain.

4. The method according to claim 1, wherein it comprises selecting, according to a set of types of anomalous operation, at least one of the following:

one or more portions of said read-out signal in the frequency domain, said one or more portions being comprised in one or more frequency ranges; and one or more neural networks of said one or more artificial neural networks configured for analysing said operating profiles in said read-out signal.

5. The method according to claim 1, wherein it comprises at least one of the following:

applying replicas of at least one single impulsive variation of a kinematic quantity that regards one or more actuators at time intervals; and using one or more of said analysed operating profiles in said read-out signal that are collected during said processing for configuring or reconfiguring said artificial neural networks for the analysis of further operating profiles in said read-out signal.

6. The method according to claim 1, wherein said operating profiles comprise at least one set of types of anomalous operation, said set of types of anomalous operation comprising types of anomalous operation of at least one kind from among the following: mechanical, electrical or electronic, and computer operation.

7. The method according to claim 1, wherein said controlling of the movement of the axes of said machine tool according to said programming sequence comprises a stop with high deceleration of one or more axes.

8. The method according to claim 7, wherein:

said operation of controlling the movement of the axes of said machine tool according to said programming sequence comprises bringing said sensor to a distance where it is close to a working surface at the end of said stop; and said read-out signal comprises a read-out signal of distance of said sensor from said working surface.

9. The method according to claim 1, wherein said read-out signal comprises a read-out signal of acceleration along one or more axes.

10. The method according to claim 1, wherein said read-out signal comprises a position read-out signal of said sensor along one or more axes.

11. The method according to claim 1, comprising generating by a computer numerical control (CNC) a sequence of programming instructions corresponding to a so-called part program for a virtual machine tool with given specifications of acceleration and velocity.

12. A machine tool, comprising:

one or more axes moved by one or more actuators;

at least one sensor coupled to said machine tool; and a processing module, comprising at least one numerical control unit, coupled to said one or more actuators in said machine tool and to said at least one sensor, wherein said processing module is configured to perform the operations of the method according to claim 1.

13. The machine tool according to claim 12, wherein said at least one sensor coupled to said machine tool comprises one or more of the following:

a triaxial accelerometer;

an encoder; and a proximity sensor coupled to an end effector of said machine tool.

14. The machine tool according to claim 12, wherein it comprises a laser machine tool.

15. A non-transitory computer-readable medium onto which a computer program product is loaded within at least one processing module, the computer program product including software code portions for executing the operations of the method according to claim 1, when the computer program product is run on the at least one processing module.

* * * * *